Nov. 3, 1936.  H. J. EDWARDS  2,059,626
VEHICLE CONSTRUCTION
Filed Jan. 16, 1935  2 Sheets-Sheet 1
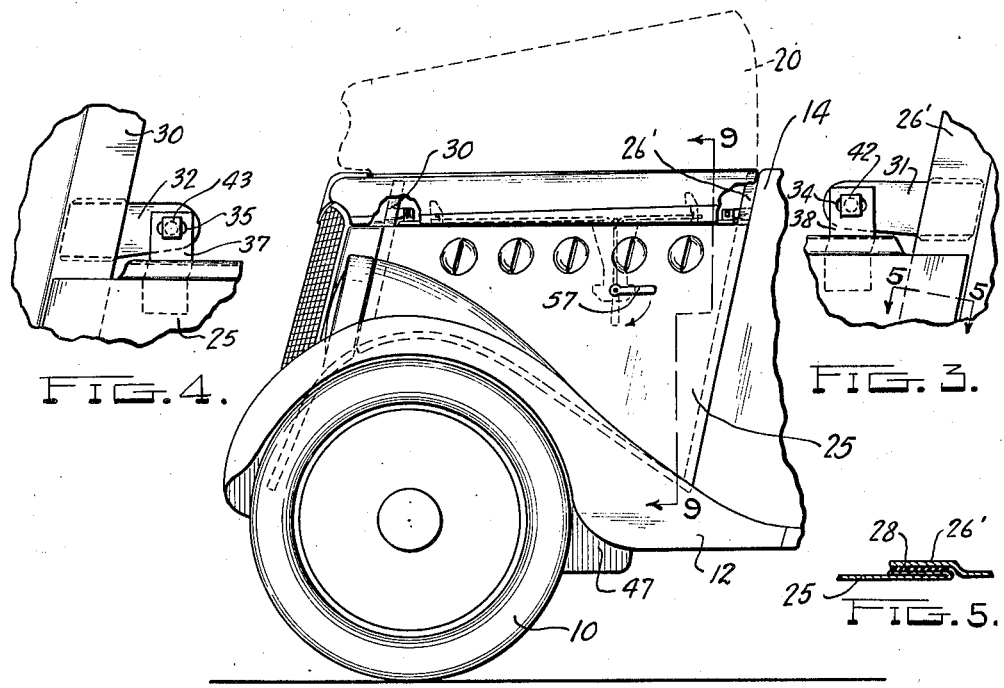
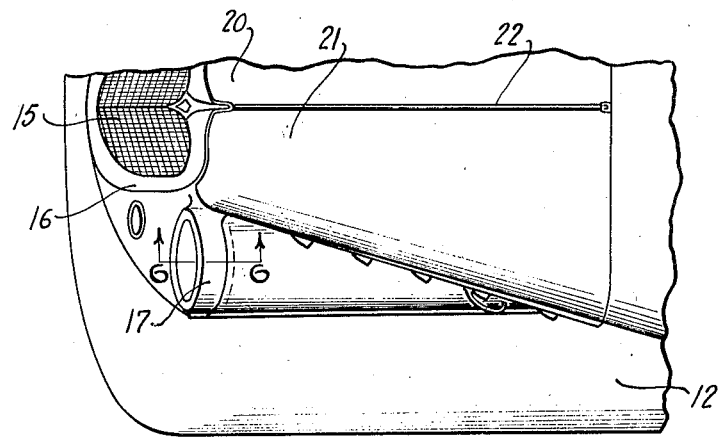
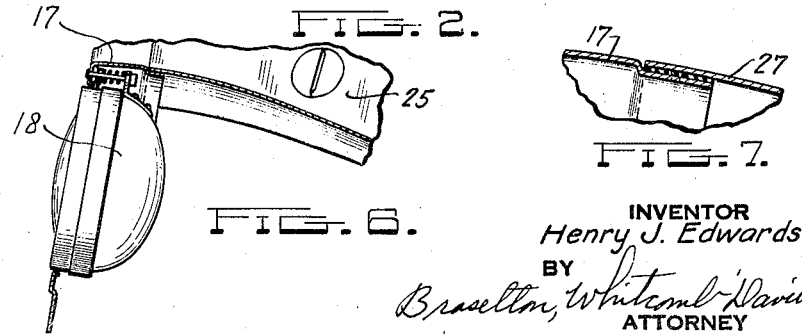
INVENTOR
Henry J. Edwards
BY
Braselton, Whitcomb Davies
ATTORNEY Nov. 3, 1936.   H. J. EDWARDS   2,059,626
VEHICLE CONSTRUCTION
Filed Jan. 16, 1935   2 Sheets-Sheet 2
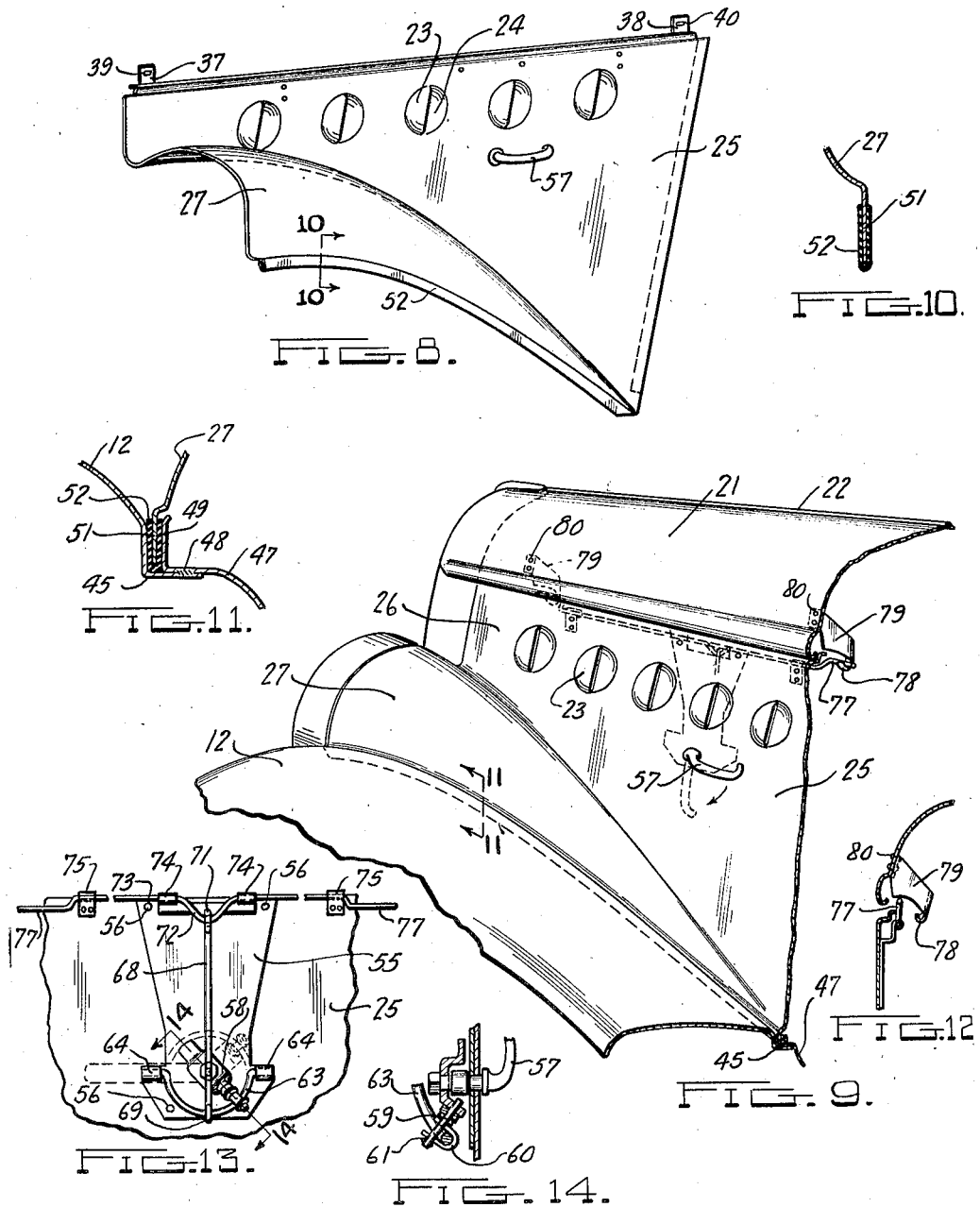
INVENTOR
Henry J. Edwards
BY
Braselton, Whitcomb & Davies
ATTORNEY Patented Nov. 3, 1936

2,059,626

UNITED STATES PATENT OFFICE 2,059,626

VEHICLE CONSTRUCTION

Henry J. Edwards, Ottawa Hills, Ohio, assignor to The Willys-Overland Company, Toledo, Ohio, a corporation of Ohio Application January 16, 1935, Serial No. 2,079

7 Claims. (Cl. 180—69)

This invention relates to a vehicle construction, and more particularly to the arrangement of enclosures for the engine compartment or forward portion of a vehicle.

The invention contemplates the provision of a simplified construction of movable hood portions for vehicles in combination with stationary side panels forming a compartment to enclose the vehicle prime mover wherein the side panels also form an enclosing housing for the headlamp structure of the vehicle.

The invention embraces the provision of side panels forming portions of the engine compartment which are secured to the vehicle dash member and the forward shell member in a manner permitting easy removal of the side panels so as to facilitate access to the vehicle engine.

A further object is the provision of stationary side panels for the motor compartment connected to the radiator shell and the dash member of the vehicle whereby the construction is substantially strengthened and whereby a fastening or locking means for the movable hood portions are carried by the side panels.

A still further object of the invention is the provision of a construction whereby stationary side panels form a portion of the cover means for the motor compartment, and are arranged to interlock with portions of the vehicle fender construction without the use of rigid fastening means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of invention, which may be preferred, in which Figure 1 is a side elevational view of a forward portion of an automotive vehicle showing the arrangement of my invention;

Figure 2 is a fragmentary top plan view showing the construction illustrated in Figure 1;

Figure 3 is an enlarged detail view showing a method of securing a panel element to the dash or cowl portion of the vehicle;

Figure 4 is an enlarged fragmentary view showing method of securing a panel element to the radiator shell or forward portion of the vehicle;

Figure 5 is a fragmentary detail sectional view taken substantially on the line 5—5 of Figure 3;

Figure 6 is a fragmentary sectional view taken substantially on the line 6—6 of Figure 2;

Figure 7 is an enlarged view showing the arrangement of joining the side panels to the radiator shell adjacent to the headlamp mounting;

Figure 8 is an isometric view showing one of the side panels forming part of my invention;

Figure 9 is an isometric view showing the arrangement of movable cover and stationary side panel elements, the hood locking means and the interlocking arrangement between the vehicle fender and side panel constructions;

Figure 10 is an enlarged sectional view taken on the line 10—10 of Figure 8 showing a lower edge of one of the side panels;

Figure 11 is a sectional view of the side panel and fender construction showing the arrangement of interlocking of the parts, the view being taken on the line 11—11 of Figure 9;

Figure 12 is a view showing means for elevating a movable cover portion;

Figure 13 is a fragmentary view showing the cover locking means;

Figure 14 is a detail sectional view taken substantially on the line 14—14 of Figure 13.

While I have illustrated the arrangement of my invention as particularly adapted for forming an enclosure or housing for the engine or prime mover of an automotive vehicle, it is to be understood that the arrangement may be used in any construction where the same may be found to be applicable.

In the drawings, numeral 10 illustrates one of the vehicle front wheels above which is mounted a fender 12, to the rear of which is illustrated the cowl portion or panel 14 forming part of the vehicle body. Arranged at the forward portion of the vehicle is a grill 15 positioned in front of a radiator core of usual construction (not shown) surrounded by radiator core enclosing shell 16 extending either side of the grill 15 and forming portions of a housing as at 17 for enclosing or surrounding a headlamp structure of the vehicle illustrated at 18 in Figure 6.

In the arrangement of my invention, the movable cover construction comprises two panels 20 and 21 hinged about a common axis adjacent the central axis of the vehicle as at 22. Each of the panels may be elevated for access to the engine as illustrated in dotted lines in Figure 1.

In the arrangement illustrated, I have provided relatively stationary members 25 positioned at either side of the engine forming the side panels 26 of the engine compartment, curved portions 27 of the panels connecting the upright or vertical portions 26 with the fenders 12. The portions 27 as illustrated converge and are curved rearwardly and downwardly toward the lower rearmost edge of the vertical portions of side panels 26 toward the rear portions of the front fenders, thus enhancing the streamlining and artistic design of the headlamp enclosure of the vehicle.

The side panels 25 may be formed with louvers or other ventilating openings, and in the embodiment illustrated these being in the form of raised spherically shaped portions 23 partially covering circular openings 24.

The cowl portion 14 of the body is provided adjacent its forward terminus with a flange 26' which forms a support for the movable cover portions 20 and 21, there being interposed between the flange 26' and panels 25 a band of fabric 28 or other suitable material to prevent squeaks or rattles occurring between the parts. The radiator shell 16 is also provided with a flange 30 which forms a support for the forward portions of the movable covers 20 and 21 and the stationary side panels 25.

Secured to the flanges 26' and 30 as by spotwelding or otherwise are projecting ears 31 and 32 which are preferably provided with elongated slots 34 and 35. The panels 25 are provided at their upper edges with projections 37 and 38 also formed with slots 39 and 40, which are adapted for registration with elongated slots in the projections 31 and 32 and are adapted to receive bolts 42 and 43 which serve as means to retain the side panels 25 in position. As particularly illustrated in Figures 9 and 11, each fender 12 is formed with a ledge or flange portion 45 which contacts with a portion of a fender side panel 47 and is secured thereto as by means of spotwelding 48 or other suitable means. Each fender side panel 47 is formed with an upwardly projecting flange portion 49 as particularly shown in Figures 9 and 11 which with the portion of the fender 12 forms a channel adapted to receive the outermost edge 51 of the extensions 27 forming integral portions of the side panels 25, the edge portion 51 being surrounded by a U-shaped gasket 52 of fabric, rubber or other suitable material so that metallic engagement between the parts is prevented. Thus, the outermost portions of side panels 25 are supported in the channel formation formed between the fenders 12 and the fender side panels 47 without additional fastening means other than the bolts joining the projections 31, 32, 37 and 38. When it is desired to remove the side panels 25 for complete access to the engine, it is only necessary to remove the bolts 42 and 43 and lift the entire side panel constructions 25 upwardly which disengages the edges 51 thereof from the grooves formed at the junction of the fenders and the fender side panels.

Locking means is provided for the movable cover or hood portions 20 and 21, which locking means is carried by the side panels 25. The same comprises a bracket member 55 riveted or otherwise secured as at 56 to the side panel, upon which is journalled a handle member 57 extending exteriorly of the side panel. The shaft portion of the handle 57 carries a bar 58 to which is secured a pin 59, the latter in turn carrying a U-shaped member 60 held in place by means of a cotter key 61. The bight of the U-shaped member loosely accommodates a curved member or bar 63 having aligned extremities which are journalled in folded portions 64 formed on the lower portion of the bracket 55. A vertically extending link 68 has its lowermost portion formed with an eye 69 surrounding the curved member 63, the upper extremity of the rod 68 being similarly formed with an eye 71 which engages an offset U-shaped portion 72 formed in a longitudinally extending locking bar 73, the locking bar being journalled in portions 74 formed as integral portions of the bracket 55 and in members 75 secured at spaced points to the side panels 25. The locking bar 73 has offset extremities 77 adapted for engagement with hooklike portions 78 formed on brackets 79 riveted or otherwise secured as at 80 to a movable cover portion 20 or 21.

Figure 9 illustrates the hood locking means in locked position, i. e., with the extremities 77 engaging the hook member 78 to hold the cover 21 in its closed position. When the handle member 57 is rotated in clockwise direction, the curved member 63 is rotated in its journals 64 and moved upwardly carrying with it the link member 68 and also causing rotation of the locking bar 73. As the locking bar is rotated, the U-shaped or offset portion 72 thereof is moved upwardly and engages the lower edge surface of the movable cover 21 to elevate the latter slightly as illustrated in Figure 12, and at the same time disengaging the extremities 77 of the bar 73 from the hooks 78. The edge of the movable cover 21 may then be easily grasped by the operator and swung to its uppermost or open position. To lock the cover in its closed position, it may be manually moved downwardly about its hinges to the position shown in Figure 12 after which the handle 57 may be rotated in a counter-clockwise direction bringing the extremities 77 of the rod 73 into engagement with the hooks 78, the length of link 68 being so proportioned as to set up a slight inherent torque or twist to be imparted to rod 73 so that the hood portion 21 is securely yet more or less resiliently held in locked position.

It is apparent that, within the scope of the invention, modifications and different arrangements may be made other than is herein disclosed, and the present disclosure is illustrative merely, the invention comprehending all variations thereof.

What I claim is:

1. A vehicle construction comprising in combination a cowl panel; a radiator core and shell therefor; fenders arranged at either side of said radiator shell; each of said fenders having a ledge portion, a pair of headlamps for said vehicle, each of said headlamps being disposed in said radiator shell at either side of the radiator core and enclosed thereby; and removable panels forming portions of the headlamp enclosures and having portions respectively engageable with the ledge portions of said fenders, said panels having curved portions terminating adjacent the rear portions of said fenders and having upwardly projecting flat portions connecting said radiator shell and said cowl panel.

2. In combination, a vehicle having a radiator shell arranged adjacent the forward portion of the vehicle and extending substantially between the front fenders of the vehicle; a cowl panel; a pair of headlamps spacedly disposed in said radiator shell; side panels having curved portions forming portion of an enclosure for the headlamp structure; single means for securing said side panels to the radiator shell and the cowl panel; and movable hinged cover portions cooperating with said panels to form an enclosed compartment.

3. A vehicle having in combination a hood; a radiator shell; and a fender having a downwardly extending vertical ledge; illuminating means mounted in said shell; an integral stationary hood side panel forming covering means for said illuminating means; said side panel having a vertical flange engaging the ledge in said fender.

4. In combination, a vehicle having a radiator shell arranged adjacent the forward portion of the vehicle and extending substantially between the fenders of the vehicle; a cowl panel; a pair of headlamps spacedly disposed in said radiator shell; portions of said radiator shell surrounding said headlamps; side panels having curved portions engaging portions of the radiator shell surrounding said headlamps and forming therewith enclosures for the headlamps; and single means for securing each of said side panels to the radiator shell and the cowl panel; and movable hood portions cooperating with said panels to form an enclosed compartment.

5. An automotive vehicle having in combination with a radiator shell and a cowl panel; side panels connecting said radiator shell and cowl panel; means for removably securing said side panels to said radiator shell and cowl panel; a pair of movable cover portions hinged about a common axis and adapted to extend between said side panels forming therewith an engine compartment; and means carried by each of said side panels for locking a movable cover portion to a side panel including a pivoted handle member for operating said locking means, said locking means being arranged whereby movement of said handle member toward unlocked position partially elevates a movable cover portion.

6. A vehicle construction comprising in combination a radiator core and shell therefor; fenders arranged at either side of said radiator shell, each of said fenders having a ledge portion; a pair of headlamps for said vehicle, each headlamp being disposed in said radiator shell at either side of the radiator core and surrounded by said shell; a pair of removable panels, each panel covering a headlamp casing, each of said panels having a portion engaging the respective ledge portion in said fenders, each of said panels having curved streamline portions terminating adjacent the rear portions of said fenders.

7. In combination, a vehicle having a radiator shell and extending substantially between the front fenders of the vehicle; a pair of headlamps spacedly disposed in said radiator shell; a cowl panel; stationary side panels connecting said shell and cowl panel and having portions surrounding said headlamps; cover portions hinged about a common axis and adapted for engagement with the upper edges of said side panels to form therewith an engine compartment; and means carried by said stationary side panels for locking said movable cover portions in closed position.

HENRY J. EDWARDS.